Jan. 16, 1968 T. R. RIX 3,364,205
METHOD OF PRODUCING A 3-KETO-4,6-BISDEHYDRO-9β,10α-STEROID
AND INTERMEDIATES OBTAINED THEREFROM
Filed Dec. 8, 1964 2 Sheets-Sheet 2
C
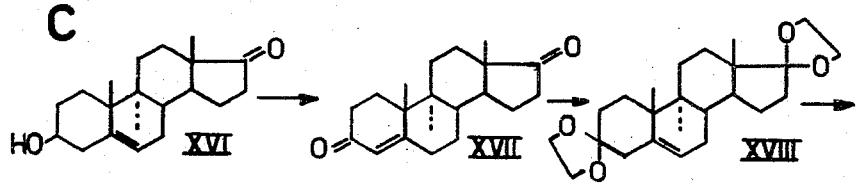
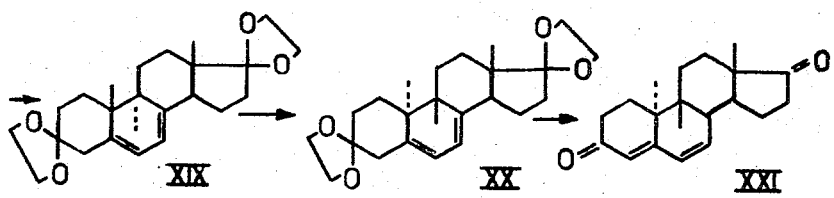
D
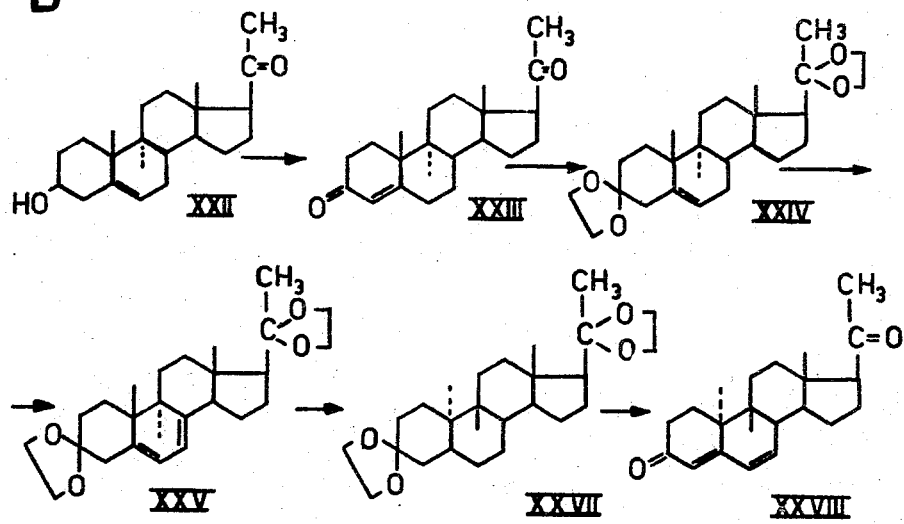
INVENTOR.
T. R. RIX
Frank R. ...
AGENT

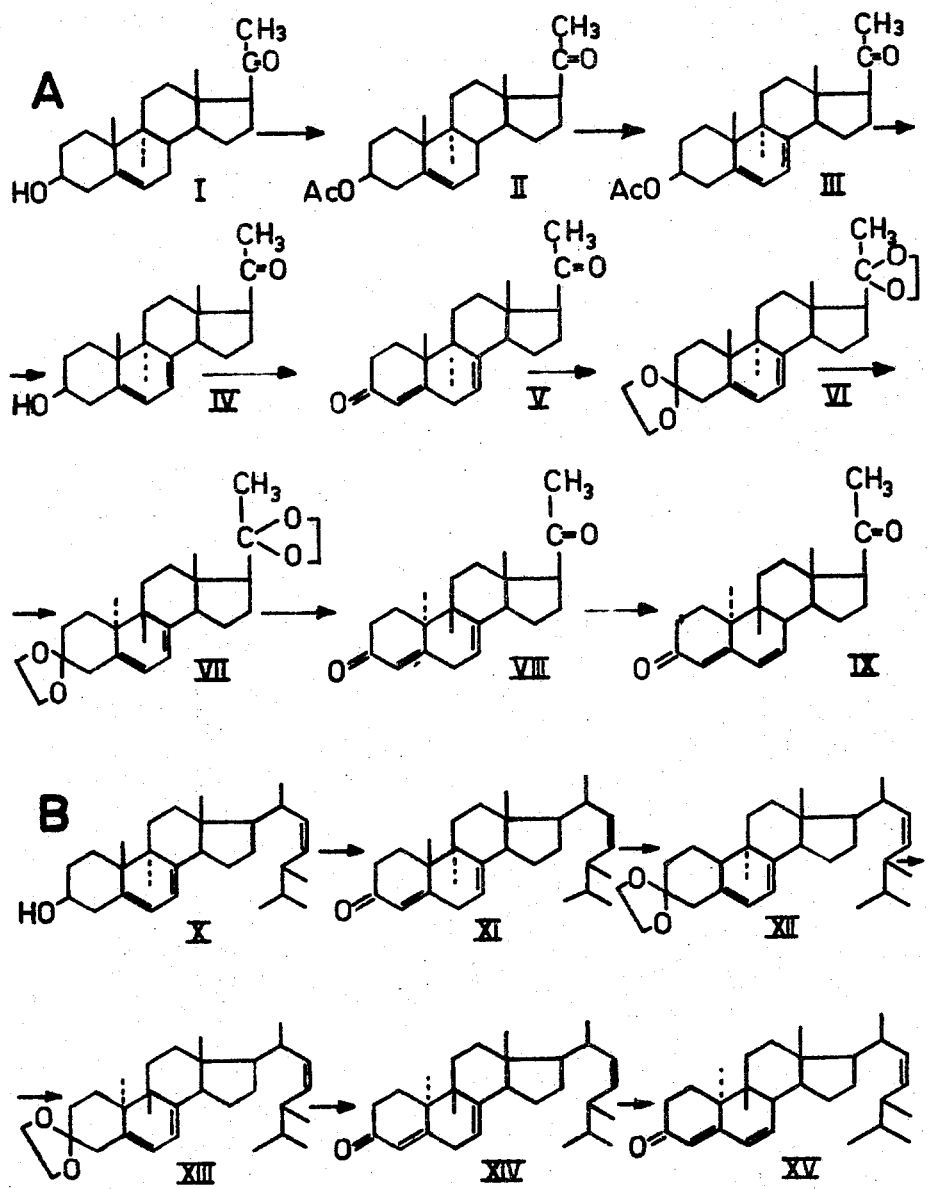

United States Patent Office

3,364,205
Patented Jan. 16, 1968

3,364,205
METHOD OF PRODUCING A 3-KETO-4,6-BISDE-HYDRO-9β,10α-STEROID AND INTERMEDIATES OBTAINED THEREFROM
Theodorus Reinder Rix, Weesp, Netherlands, assignor to North American Philips Company, Inc., New York, N.Y., a corporation of Delaware
Filed Dec. 8, 1964, Ser. No. 416,744
Claims priority, application Netherlands, Dec. 9, 1963, 301,566
28 Claims. (Cl. 260—239.55)

ABSTRACT OF THE DISCLOSURE

Method of producing 3 keto-4,6-bisdehydro 9β,10α steroids from a 5,7-bisdehydro 9α,10β steroids wherein an Oppenauer oxidation step precedes an U.V. irradiation step. Intermediate 5,7 bisdehydro 9β,10α steroids such as 9β,10α-pregna-5,7-diene-3,20-dione 3,20-bis-ketal and 9β,10α-ergosta-5,7,22-triene-3-one-3 ethylene ketal are disclosed.

This abstract is in no way intended to be a description of the invention defined by the claims.

---

Belgian patent specification No. 577,615 (PH. 14.984) deals with a new group of steroids having remarkable pharmacological properties and which differ from the normal steroids with respect to the configuration at the carbon atoms 9 and 10. While the normal steroids have a 9α,10β-configuration, the new group of pharmacologically interesting steroids has a 9β,10α-configuration. These normal steroids will hereinafter be referred to as "steroids," whereas the compounds of the new group of steroids will be referred to as "9β,10α-steroids."

These new 9β,10α-steroids are to be prepared by irradiating a 5,7-bisdehydro normal steroid with ultra-violet light, which process may be followed, if desired, by removal and/or introduction of substituents and/or double bonds, as so far no other methods have become available to arrive at the 9β,10α-configuration.

In the irradiation process a 3-hydroxy-5,7-bisdehydro steroid is a very suitable starting material, in particular because natural occurring steroids having a 3-hydroxy group (or an esterified or etherified 3-OH group) and a double bond at position 5 are abundantly available, while the double bond at position 7, when absent, can easily be introduced. In practice, the 3-hydroxy group is oxidised to a 3-keto group after the irradiation has taken place mainly because the pharmacologically most interesting compounds contain a 3-keto group.

In general, oxidation of a 3-hydroxy steroid to a 3-keto steroid does not present any difficulties at all, as many suitable methods giving high yields are available. In particular, good results have been obtained by following the Oppenauer oxidation method.

The term "Oppenauer oxidation" when used herein means the oxidation of a secondary alcohol group with a ketone in the presence of a catalyst, wherein the ketone acts as a hydrogen acceptor and in general the catalyst is an aluminum alcoholate such as aluminum isopropylate.

Unfortunately it has now been found that oxidation of a 3-hydroxy-9β,10α-steroid to a 3-keto-9β,10α-steroid gives lower yields than the same oxidation in the normal series.

It has now been found that by reversing the known sequence of first U.V. irradiation of a 3-hydroxy-5,7-bisdehydro steroid (or esters or ethers thereof) followed by Oppenauer oxidation of the irradiated product produces the desired effect of an improved overall yield, as compared with the yield when the Oppenauer oxidation of a 3-hydroxy-9β,10α-steroid follows the U.V. irradiation of a 3-hydroxy-5,7-bisdehydro steroid.

Thus the main idea underlying this invention is to be seen in the consideration that in the process of producing 3-keto-4,6-bisdehydro-9β,10α-steroids by U.V. irradiation of a 5,7-bisdehydro steroid and Oppenauer oxidation of a 3-hydroxy group, the Oppenauer oxidation should precede the U.V. irradiation step if optimal yields are to be produced.

More particularly, the method according to the invention consists in a method of producing a 3-keto-4,6-bisdehydro-9β,10α-steroid by U.V. irradiation of a 5,7-bisdehydro-steroid and Oppenauer oxidation of a 3-hydroxy-steroid, characterized in that the Oppenauer oxidation of the 3-hydroxy steroid precedes the U.V. irradiation and that after the irradiation the resulting 5,7-bisdehydro-9β,10α-steroid is converted to a 3-keto-4,6-bisdehydro-9β,10α-steroid.

It should be observed that in the process according to the invention it is neither necessary that the irradiation step directly follows the Oppenauer oxidation, nor that directly after the irradiation conversion of the 5,7-bisdehydro-system into the 4,6-bisdehydro-system takes place. As long as the following sequence of the reactions:

(a) Oxidation of a 3-hydroxy group according to the Oppenauer method,
(b) Irradiation of the 5,7-bisdehydro-system and
(c) Conversion to the 3-keto-4,6-bisdehydro group is maintained, any intermediate reaction may be inserted between the steps (a) and (b) or between (b) and (c), in particular esterification of a 3-hydroxy group, saponification of an esterified 3-hydroxy group, ketalisation of a 3-keto group, deketalisation of a ketalised 3-keto-group, allylic halogenation of a 3-esterified-hydroxy-5-dehydro group, allylic halogenation of a 3-ketalised keto-5-dehydro group, dehydro-halogenation of a 5-dehydro-7-halogeno group or isomerisation of a 7-dehydro bond into a 6-dehydro bond.

While the above-mentioned reactions all involve reactions at one or more of the carbon atoms 3, 4, 5, 6, 7 and 8, it is also possible that intermediate reactions are carried out at other carbon atoms of the steroid skeleton such as 1, 2, 11, 17, 20, 21. Such reactions may relate to introduction of substituents, for example of hydroxy, alkyl, or halogen atoms, or to side chain degradation reactions in case the compound in question has, for example, at carbon atom 17 the side chain of ergosterol.

Further it should be pointed out that Oppenauer oxidation of a 3-hydroxy-5,7-bisdehydro-steroid results in the formation of a 3-keto-4,7-bisdehydro-steroid, which compound, as it lacks the correct system of conjugated double bonds, cannot be irradiated to produce a 9β,10α-steroid. For this reason in such a case the Oppenauer oxidation product should be ketalised, which reaction according to Antonucci, J. Org. Chem. 17, pages 1369–1374 (1952) yields a 3-ketalised keto-5,7-bisdehydro-group.

According to a preferred embodiment the invention consists of Oppenauer oxidation of a 3-hydroxy-5-dehydro-steroid to produce a 3-keto-4-dehydro-steroid followed by ketalising the latter compound to produce a 3-ketal-5-dehydro-steroid followed by introduction of a double bond at position 7, followed by U.V. irradiation of the resulting 3-ketal-5,7-bisdehydro-steroid to produce the corresponding 3-ketal-5,7-bisdehydro-9β,10α-steroid, which latter compound is deketalised and converted into a 3-keto-4,6-bisdehydro-9β,10α-steroid.

Suitable starting materials in this sequence of reactions are, for example, 3β-hydroxy-androst-5-en-7-one and 3β-hydroxy-pregn-5-en-20-one.

According to another interesting embodiment of the invention a 3-hydroxy-5,7-bisdehydro-steroid is subjected to Oppenauer oxidation to produce a 3-keto-4,7-bisdehydro-steroid, which compound is ketalised to produce a 3-ketal-5,7-bisdehydro-steroid, which latter compound is subsequently irradiated with ultraviolet light to produce the corresponding 3-ketal-5,7-bisdehydro-9β,10α-steroid, which compound thereafter is deketalised and converted into a 3-keto-4,6-bisdehydro-9β,10α-steroid.

Suitable starting materials in this sequence of reactions are, for example, ergosta-5,7,22-trien-3β-ol and 3β-hydroxy-pregna-5,7,dien-20-one.

Thus, for example, the following reactions can be carried out according to the method of the invention (see drawings).

(A) 3β-hydroxy-pregn-5-en-20-one (I) is acetalised to produce the corresponding 3-acetate compound (II). This compound is brominated with N-bromosuccinimide in 7-position followed by dehydrobromination to produce 3β-hydroxy-pregna-5,7-diene-20-one 3-acetate (III), which compound after saponification of the ester group at carbon atom 3 (IV) is subjected to Oppenauer oxidation to produce pregna-4,7-diene-3,20-dione (V), which compound is ketalised to produce pregna-5,7-diene-3,20-dione 3,20-bis-ethylene ketal (VI), subsequently irradiated with U.V. light to produce the corresponding 9β,10α-steroid (VII). This compound is deketalised to produce 9β,10α-pregna-4,7-diene-3,20-dione (VIII), which compound after isomerisation of the 7-dehydro-bond yields 9β,10α-pregna-4,6-diene-3,20-dione (IX).

(B) Ergosta-5,7,22-triene-3β-ol (X) is subjected to Oppenauer oxidation to produce ergosta-4,7,22-triene-3-one (XI), which compound is ketalised with ethylene glycol to produce ergosta-5,7,22-triene-3-one 3-ethylene ketal (XII). The latter compound is irradiated with U.V. light to produce 9β,10α-ergosta-5,7,22-triene-3-one 3-ethylene ketal (XIII), this compound is deketalised to produce 9β,10α-ergosta-4,7,22-triene-3-one (XIV), which latter compound on isomerisation produces 9β,10α-ergosta-4,6,22-triene-3-one (XV).

(C) 3β-hydroxy-androst-5-en-17-one (XVI) is subjected to Oppenauer oxidation to produce androst-4-ene-3,17-dione (XVII), which compound is ketalised to produce androst-5-ene-3,17-dione 3,17-bis-ethylene ketal (XVIII). The latter compound is brominated in allylic position with N-bromosuccinimide, followed by dehydrobromination to produce androsta-5,7-diene-3,17-dione 3,17-bis-ethylene ketal (XIX). This compound is irradiated with U.V. light to produce the corresponding 9β,10α-compound. The latter compound is treated in the same way as mentioned under A or B to produce 9β,10α-androsta-4,6-diene-3,17-dione (XXI).

(D) 3β-hydroxy-pregn-5-en-20-one (XXII) is subjected to Oppenauer oxidation to produce pregn-4-ene-3,20-dione (XXIII), which compound is ketalised to produce pregn-5-ene-3,20-dione 3,20-bisethylene ketal (XXIV). The latter compound is brominated in allylic position with N-bromosuccinimide, followed by dehydrobromination to produce pregna-5,7-diene-3,20-dione 3,20-bis-ethylene ketal (XXV). This compound is irradiated with U.V. light to produce the corresponding 9β,10α-compound (XXVI). The latter compound is treated in the same way as mentioned under C to produce 9β,10α-pregna-4,6-diene-3,20-dione (XXVII).

It should be observed that in the Examples A to D the final two steps, namely deketalising and isomerisation of a 7-dehydro-bond to produce a 6-dehydro-bond, are preferably carried out in one step, as will be explained hereinafter.

With respect to the methods mentioned in the foregoing definition of the invention or the special embodiments thereof reference may be made to methods well-known from the literature.

Thus Oppenauer reactions are described in detail by Roger Adams, Organic Reactions VI, pages 207–272. A useful method is described by MacPhillamy and Scholz (J. Biol. Chemistry, 178, page 39 (1949)), and according to this method the oxidation is carried out with cyclohexanone and aluminum isopropylate in a medium of dry toluene.

Ketalisation reactions are generally carried out with glycols or dioxolanes, such as ethylene glycol or 2-methyl-4,4-ethylene dioxypentene-2

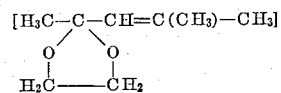

or 2-methyl-2-ethyl-1,3-dioxolane. The ketalisation reaction must be carried out under such circumstances that the double bond between carbon atoms 4 and 5 shifts to the 5,6 position. This requires a ketalisation reaction under mildly acid conditions, which can suitably be fulfilled with p-toluene sulphonic acid or the etherate of borium trifluoride in catalytic amounts. Reviews on ketalisation reactions are written by Loewenthal in "Tetrahydron" 6, pages 287–290 (1959), Fieser and Fieser in "Steroids," pages 307–310 (1959) and Lettré-Inhoffen-Tsesche in "Ueber Sterine, Gallensäuren und verwandte Naturstoffe" 2, pages 260–262.

Very suitable methods have been described by Antonucci et al. in J. Org. Chem. 16, 1891 (1951) and by Dauben in J. Am. Chem. Soc. 76, 1359 (1954).

In our hands the best method was ketalising in glycol in the presence of p-toluene sulphonic acid while removing water as it is produced during the reaction.

Introduction of a 7-dehydro bond in a 3-ketal 5-dehydro-steroid is described by Bernstein et al. in J. Org. Chem. 18, pages 1418–1426 (1953) and introduction of a 7-dehydro bond in an esterified 3-hydroxy steroid is described in U.S. patent specification 2,442,091. A suitable method is the reaction with N-bromosuccinimide or with N,N'-dibromodimethylhydantoine.

U.V. irradiation suitably takes place with light of wavelengths between 220 and 320 mμ, for example, such as normally produced by high-pressure mercury vapour lamps such as "Philips HO 2000." The period of irradiation depends upon several factors, inter alia the amount of substance to be irradiated, the intensity of the light source and the distance between the light source and the substance to be irradiated. The substance should be in the dissolved state, as will be more or less obvious. It is advantageous to choose the wavelength of the irradiation in such a manner that during the first irradiation phase the substance is irradiated with short-wave U.V. light of which more than 20% of the radiation energies have a wavelength between 220 and 290 mμ, followed by a second phase of long-wave U.V. radiation of which less than 20% of the radiation energies lie between 220 and 290 mμ and the remainder above 290 mμ, but mainly below 350 mμ.

Deketalisation of a 3-ketal-5,7-bisdehydro-9β,10α-steroid to a 3-keto-4,7-bisdehydro-9β,10α-steroid may take place by reaction with an excess of a ketone, such as acetone or butanone-2, or by means of a hydrolisation reaction, for example with a mixture of acetic acid and water.

Conversion of a 3-keto-4,7-bisdehydro-9β,10α-steroid to produce a 3-keto-4,6-bisdehydro-9β,10α-steroid can easily be carried out by isomerising the latter compound in an acidic substantially non-aqueous medium as described in applicant's Belgian Patent 575,696.

According to this publication isomerisation of a 3-keto-Δ⁴,⁷-bisdehydro-9β,10α-steroid to a 3-keto-Δ⁴,⁶-bisdehydro-9β,10α-steroid can easily be carried out while producing comparatively high yields of the latter compound in a substantially waterfree acidic medium while using a lower aliphatic alcohol as a solvent. The acid is preferably a hydrogen halide, preferably hydrogen chloride.

According to a particularly interesting and preferred embodiment of the invention a 3-ketal-5,7-bisdehydro-9β,10α-steroid is converted in one step into a 3-keto-4,6-bisdehydro - 9β,10α - steroid. This surprising reaction, in which in one reaction both the ketal group is split off and isomerisation of the 5,7-bisdehydro-system into a 4,6-bisdehydro-system takes place, is carried out by treating the starting material in a substantially waterfree aliphatic alcohol having 1 to 6 carbon atoms containing at least 30% by weight of hydrogen halide calculated on the amount of alcohol, in which mixture other solvents may be dissolved, provided these are substantially waterfree.

The aliphatic alcohol is, for example, methanol, ethanol, propanol, propanol-2, butanol or pentanol and preferably ethanol. The reaction medium must contain less than about 1% by weight of water. The hydrogen halide is, for example, hydrogen chloride, -bromide or -iodide, but preferably the chloride. The other solvents are, for example, halogenated lower hydrocarbons, such as methylene dichloride, chloroform, 1,2- or 1,1-dichloro-ethane, ethylbromide, trichloroethylene, 1,1,1- or 1,1,2-trichloro-ethane or mixtures thereof. A ratio of 1 part of aliphatic alcohol and 1 part of other solvent produces attractive results, but a ratio of 1 part of lower aliphatic alcohol and 30 parts of other solvents is still workable (the parts are "by weight"). However, in any event the amount of other solvents should not come into conflict with the aforementioned rule of minimum amounts of hydrogen halide with respect to the amount of aliphatic alcohol.

The reaction is preferably carried out at a temperature between $-10°$ C. and $60°$ C. during a period of 15 minutes to 4 hours.

The reaction is preferably carried out for the conversion of 9β,10α-pregna-5,7-diene-3,20-dione 3,20-diketal into 9β,10α-pregna-4,6-diene-3,20-dione 9β,10α-ergosta-5,7,22-triene-3-one 3-ketal into 9β,10α-ergosta-4,6,22-triene-3-one or 9β,10α-androsta-5,7-diene-3,17-dione 3,17-diketal into 9β,10α-androsta-4,6-diene-3,17-dione. In these preferred reactions the ketal group preferably is an ethylene ketal.

EXAMPLES (1) According to the method described by Phillamy and Scholz, J. Biol. Chem. 178, 37 (1949), 100 g. of 3β-hydroxy-pregn-5-en-20-one were converted into 85 g. of progesterone. 50 g. of the resulting progesterone were mixed with 700 ml. of ethylene glycol and 150 mg. of p-toluene sulphonic acid. The mixture was gently heated, while stirring and under nitrogen. Ethylene glycol was slowly distilled off at a pressure of 14 mm. and a temperature of about 106° C. After about 30 minutes the distillation was terminated. The residue was a thick crystalline precipitate of 3,20-diketal of progesterone. After cooling to room temperature the crystalline product was neutralised with 15 mls. of a 2% solution of KOH in ethanol (96%). This mixture was extracted twice with portions of methylene chloride totalling 400 ml. to dissolve the diketal.

The methylene chloride solution was subsequently extracted twice with portions of water totalling 200 ml. and then dried over sodium sulphate and filtrated over a decolorising clay. The solvent was distilled off in vacuo and the residue dissolved while boiling in 500 ml. of ethyl acetate. The diketal was crystallised at $-25°$ C. After recrystallisation and reketalising of the mother liquor, a total yield of 90% (59.3 g.) of 3,20-diketal of progesterone can be obtained (M.P. 178.5–181° C.).

40 g. of this 3,20-diketal of progesterone were dissolved under nitrogen in 2100 ml. of petroleum ether (B.P. 60–80° C.), while stirring. To this solution were added 15.4 g. of N,N' - dibromo-dimethylhydantoine and immediately thereafter 20 ml. of collidine. The mixture was boiled for 3 to 4 minutes.

The reaction mixture was cooled to room temperature and filtrated. The solid mixture mainly consisted of N,N'-dimethylhydantoine and the 7-bromo compounds of the starting material. The mixture was washed with 1000 ml. of carbon tetrachloride to dissolve the 7-bromo compound.

The petroleum ether- and carbon tetrachloride solutions were collected and evaporated in vacuo. To the residue of 7-bromo compound an additional amount of 140 ml. collidine was added in a nitrogen atmosphere while stirring. Dehydrobromination was carried out at 120° C. during fifteen minutes. The reaction mixture was subsequently cooled to room temperature. 300 ml. of water and 300 ml. of benzene were added. The benzenic layer was separated off and the aqueous layer was again extracted with 150 ml. of benzene. The benzenic solutions were washed several times with ice and 2 N sulphuric acid to remove collidine and subsequently washed with water, sodium bicarbonate and water. Thereupon the benzenic solution was dried over sodium sulphate, filtrated, evaporated and the residue washed with three portions of 25 ml. of acetone. The crude product had a content of 92% of 3,20-bisethylene ketal of pregna-5,7-diene-3,20-dione. The crude product was recrystallised from ethylacetate at $-25°$ C.

20 g. of 3,20-bisethylene ketal of pregna-5,7-diene-3,20-dione were dissolved in 2000 ml. of ethylacetate and 2 ml. of triethylamine. This solution was irradiated with a mercury high-pressure lamp of 1500 watts (Philips H.O.P. 1500) during 2 hours and 10 minutes. The light source was immersed in the solution which solution was circulated continuously during irradiation. Between the light source and the solution a filter was placed which absorbed U.V. light having a wave-length smaller than 290 mμ. After irradiation the solvent was evaporated until 200 ml. remained. From this solution crystallised 11.85 g. of unchanged starting material and another 0.85 g. after further evaporation to 100 ml. 20 ml. of methanol (96%) were added after additional evaporation to a volume of 20 ml. The mixture was cooled to $-5°$ C. and subsequently 3,20-bisethylene ketal of 9β,10α-pregna-5,7-diene-3,20-dione crystallised (melting point 140–143° C.). The crude product was recrystallised from ethylacetate. The pure product melted at 155–156° C.

$[\alpha]_D^{25} = +157.5°$ in $CHCl_3$. $\epsilon_{\lambda max \ 271.5 \ m\mu} = 9,400$.
I.R.=1665, 1610, 1250, 1230, 1105, 1070, 1050, 960, 870, 815 cm.$^{-1}$ 5.65 g. of the aforesaid 9β,10α-diketal (net content 88.5%) were dissolved in 75 ml. of methylene dichloride. This solution was cooled to $-10°$ C. and was added while stirring to 75 ml. of a solution of 53 g. of hydrogen chloride in 100 g. of dry ethanol (cooled to $-10°$ C.). The mixture was kept for 30 minutes at $-10$ C. Thereafter the reaction mixture was poured into 160 ml. of water and 180 g. of ice. The organic layer was separated off and the aqueous layer was extracted with 40 ml. of methylene dichloride. The combined organic layers were washed succesively with (a) 40 ml. of water,
(b) 40 ml. of an aqueous 2% sodium bichromate solution, and
(c) 3 times with 40 ml. of water.

The organic solution was filtrated and dried over sodium sulphate, followed by evaporation of the solvent. The residue was taken up in a small amount of a mixture of equal parts of methylene dichloride and diethyl ether. This solution was evaporated in such a manner that the greater part of methylene dichloride had disappeared. When crystallising started the mixture was cooled to $-25°$ C. to complete crystallisation. Two fractions were isolated, one having a melting point of 162.5–166.5° C. and another one having a melting point of 160–166.5° C. The residue was again isomerised in a mixture of 34 ml. of methylene dichloride and 34 ml. of sodium of 53 ml. hydrogen chloride in dry ethanol at a temperature of −10° C. during 30 minutes. The isomerisation product was worked up as described above. After evaporation of the methylene dichloride the residue was dissolved in benzene, this solution decolorised by treatment with an active clay and thereupon evaporated. The residue of this operation was taken up in a mixture of equal parts of methylene dichloride and diethyl ether and subsequently evaporated till crystallisation started. From then on crystallisation was continued at a temperature of −25° C.

(2) Androstene-dione was prepared from 3β-hydroxy-androst-5-en-17-one according to the method of Oppenauer in benzene and cyclohexanone with aluminum isopropylate as a catalyst in a yield of 85%.

10 g. of androst-4-ene-3,17-dione were suspended in 200 ml. of glycol and 20 mg. of p-toluene sulphonic acid. The mixture was subjected to distillation in vacuo (temperature of the boiling liquid 104° C.). In three hours 100 ml. of glycol distilled off. To the residue 10 ml. of 2 N potassium hydroxide in ethanol (96%) and 200 ml. of benzene were added. The layer of ethylene glycol was separated off and extracted once with 50 ml. of benzene. The layers of benzene were collected, washed with water to neutral reaction, the solvent was evaporated and the residue crystallised from ethylacetate at −5° C. Yield 9.16 g. (70.2%) of 3,17-bis-ethylene ketal of androsta-5-ene-3,17-dione (melting point 172–173° C.). The yield was increased to 90% by ketalising the mother liquor followed by crystallisation.

7.48 g. of 3,17-bis-ethylene ketal were dissolved in 250 ml. of petroleum ether 60–80 B.P. and 1 ml. of collidine. The sodium was heated to boiling and 3.04 g. of N,N′-dibromo-dimethylhydantoine were added. Boiling was continued for 5 minutes. The mixture was cooled to room temperature. The precipitate formed was washed with carbon tetrachloride until no further precipitate dissolved. A residue of 1.4 gm. of dimethylhydantoine remained on the filter. 30 ml. of collidine were added to the collected filtrates, from which mixture the low boiling solvents were removed by distillation in vacuo. The residue was heated at 140° C. during 10 minutes under a stream of nitrogen. Diethylether was added after cooling to room temperature and the mixture was subsequently washed with water, three times with 2 N sulphuric acid (to remove collidine) with aqueous sodium bicarbonate solution and three times with water to neutral reaction. Subsequently the solution was dried over sodium sulphate, filtrated, the solvent evaporated and the residue crystallised from acetone at −5° C. Melting point 153.5–155° C. Content of 5,7-bisdehydro-compound: 84.5% (based on U.V. spectrum).

23.6 g. of 3,17-bis-ethylene ketal of androsta-5,7-diene-3,17-dione (corresponding to 20 g. of pure 5,7-bisdehydro-compound) were dissolved in 2000 ml. of diethylether. The solution was irradiated for two hours as described in the foregoing example.

The irradiated solution was evaporated in vacuo to a volume of 200 ml. and subsequently cooled to −10° C. The solution crystallised and produced 8.24 g. of unchanged starting material (melting point 156–157° C. content 77%). The mother liquor was diluted with 100 ml. of methanol (96%). 3.25 g. of unchanged starting material (melting point 156.5–157.5° C; content 72%) crystallised at room temperature. 4.16 g. of impure 3,17-bis-ethylene ketal of 9β,10α-androsta-5,7-diene-3,17-dione crystallised from the mother liquor at −25° C., melting point 112–125° C. The product was recrystallised from acetone. Melting point 161–162° C.

$[\alpha]_D^{25} = +81°$ C. $\epsilon_{\lambda max\ 271m\mu} = 9{,}650$.

Infrared absorption at 1660, 1605, 1115, 1098, 1040, 1019, 997, 953, 819 cm.$^{-1}$ 1 g. of recrystallised diketal (content of pure product 85%) was dissolved in 50 ml. of methylene dichloride. The solution was added to 15 ml. of a solution prepared by dissolving 50 g. of hydrochloric acid gas in 100 g. of dry ethanol. The reaction mixture was kept at 0° C. for 30 minutes. The reaction product was worked up in the same manner as described in the foregoing example. The resulting product was 9β,10α - androsta - 4,6 - diene-3,17-dione. Melting point 189–190° C.

$\epsilon_{\lambda max} = 25{,}400$. Max in infra-red spectrum: 1735, 1652, 1625 cm.$^{-1}$ (3) To a solution of 60 g. of dry hydrochloric acid gas in 120 ml. of dry ethanol at 0° C. was added a solution of 10 g. of 9β,10α-ergosta-5,7,22-triene-3-one 3-ethylene ketal in 140 ml. of dry methylene dichloride having a temperature of 0° C. The reaction mixture was kept at 0° C. during 30 minutes and then poured out in 160 ml. of water and 180 g. of ice. The organic layer was separated off and the aqueous layer was extracted with 40 ml. of methylene dichloride. The combined organic layers were washed successively with (a) 40 ml. of water,
(b) 40 ml. of 2% aqueous solution of sodium bicarbonate, and
(c) 3 times with 40 ml. of water.

The organic solution was dried over sodium sulphate and the solvent evaporated. The residue was taken up in 20 ml. of boiling petroleum ether (boiling point 40–60° C.). This solution was brought to crystallization by cooling to −25° C., resulting in 9β,10α-ergosta-4,6,22-trien-3-one. Melting point 100–101° C.

The ketals and bis-ketals as described in this application are useful intermediates in the synthesis of pharmacologically active compounds.

Thus 9β,10α-pregna-5,7-diene-3,20-dione 3,20-bis-ketal gives on hydrolysis and isomerisation 9β,10α-pregna-4,6-diene-3,20-dione, which is progestationally active; 9β,10α-androsta-5,7-diene-3,17-dione 3,17-bis-ketal gives on hydrolysis and isomerisation 9β,10α-androsta-4,6-diene-3,17, dione, which compound on conversion into 17β-hydroxy 9β,10α-androsta-4,6-diene-3-one 17-acetate produces a compound having anabolic activity; 9β,10α-ergosta-5,7-dien-3-one 3-ethylene ketal gives after hydrolysis and isomerisation 9β,10α-ergosta-4,6-dien-3-one, which compound after side-chain degradation can be converted into 9β,10α-pregna-4,6-dien-3,20-dione, which is progestationally active.

(4) 50 g. of pregna-5,7-diene-3,20-dione-3,20-diethylene ketal were dissolved in 1 litre of acetone. This compound was produced according to the method as described in Example 1. The solution was stirred and 500 ml. of acetic acid and 40 ml. of water were added. After the mixture had been kept at 60° for 20 minutes, it was poured on crushed ice. The precipitated solid was separated, washed with water and sodium bicarbonate solution.

Crystallization from ethylacetate yielded 34.4 g. (77%) of pregna-5,7-diene-3,20-dione 3-ethylene ketal (M.P.) 202–207°).

Pregna-5,7-diene-3,20-dione-3-ethylene ketal (34.4 g.) was dissolved in 2.3 l. of methylacetate and irradiated for 2.5 hours in the same way as described in Example 1. The solvent was evaporated to 240 ml. and 200 ml. of methanol were added. After crystallization at −15° 17.3 g. of unchanged starting material were obtained and another 0.96 g. after further concentration of the mother liquor. After evaporation of the solvent, the residue was dissolved in 100 ml. of methanol. Crystallization at −25° gave 2.6 g. of impure 9β,10α-pregna-5,7-diene-3,20-dione 3-ethylene ketal. Recrystallization from a mixture of methylene-dichloride and ethanol gave a product that contained 85% of 9β,10α-pregna-5,7-diene-3,20-dione-3-ketal according to the calculation based on the U.V. absorption spectrum. 1.68 g. of the aforementioned 9β,10α-ketal (net content 85%) were dissolved in 25 ml. of methylene-dichloride. This solution was cooled till −5° C. and added while stirring to 25 ml. of a solution of 53 g. of hydrogen chloride in 100 g. of dry ethanol (cooled to −5° C.). After 30 minutes the reaction mixture was worked up in the same way as described in Example 1.

The product was identified to be 9β,10α-pregna-4,6-diene-3,20-dione by melting point and mixed melting point, U.V. and I.R. absorption spectra.

(5) 17α - ethynyl - androst - 5 - ene - 3,17β - diol was subjected to Oppenauer oxidation in a medium containing toluene, cyclohexanone and aluminium isopropylate, the latter as a catalyst. 17α-ethynyl-testosterone was ketalized to produce 17α - ethynyl - androst-5-en-17β-ol-3-on-3-ethylene ketal. 125 g. of this compound were suspended in 2.5 l. of methanol, 20 g. of Pd/CaCO$_3$ catalyst were added and hydrogenated until 15.2 litres of hydrogen were consumed. The reaction mixture was warmed until the organic material had dissolved and the catalyst was removed by filtration. The solvent was evaporated in vacuo until crystallization took place and the mixture was stored overnight at —15°. The yield was 100 g. of 17-ethyl-androst-5-en - 17β - ol - 3 - on-3-ethylene ketal, M.P. 186–193°. Recrystallizations from methanol and ethylacetate gave an analytically pure sample with M.P. 197–199°.

I.R. absorption maxima at 795, 860, 1000, 1010, 1100, 2820 and 3510 cm.$^{-1}$ $[\alpha]_D^{25°} = -52°$ 100 g. of this monoketal were dissolved in a mixture of 2 l. of petroleum ether (40–60°), 800 ml. of methylene dichloride and 20 ml. of collidine. To this solution were added 41.2 g. of N,N'-dibromo-dimethylhydantoine and the mixture was refluxed while stirring for 15 minutes. The reaction mixture was cooled to room temperature and filtrated. The solid consisted of dimethylhydantoine and the solution was evaporated in vacuo after addition of 600 ml. of s-collidine. When the temperature reached 90° in vacuo nitrogen was permitted to enter the reaction vessel and the temperature raised to 130° and kept there for 15 minutes. The reaction mixture was worked up as described in Example 1 and the product crystallized from ethylacetate. The yield was 51 g., M.P. 161–164°, containing 81% of 17α - ethyl - androsta - 5,7 - dien-17β-ol-3-on 3-ethylene ketal.

20 g. of the aforementioned ketal were dissolved in 2 litres of ethylacetate and irradiated for 85 minutes in the same way as described in Example 1. The solvent was evaporated to 100 ml. After cooling several crops of crystalline material, consisting of a mixture of starting material and the corresponding 9β,10α-compound, according to the U.V. absorption spectra, were obtained. The mixture was acetalised in order to separate the 9β,10α-compound from the corresponding normal steroid.

17-ethyl - 9β,10α - androsta - 5,7 - dien - 17β - ol - 3 - on 3 ethylene ketal 17-acetate shows the following analytical data. This compound was hydrolysed in the same way as described in the foregoing examples to produce 17α-ethyl - 9β,10α - androsta - 4,6 - dien-17β-ol 17-acetate, M.P. 172–173°, ε(λ max.=271 mμ)=10,600 and I.R. maxima at 3050, 2820, 1730, 1245, 1100, 1040, 1050, 819 cm.$^{-1}$ $[\alpha]_D^{25°} = +161°$ (6) According to the method of Oppenauer androst-5-ene-3,17-diol 17-acetate was oxidised in toluene and cyclohexanone, with aluminium isopropylate as a catalyst in a yield of 82% to produce testerone acetate. 128 g. of testosterone acetate were suspended by vigorous stirring in 1280 ml. of ethylene glycol and after addition of 3.2 g. of p-toluene sulfonic acid 750 ml. of ethylene glycol were distilled in vacuo during a 3 hours' period. The reaction mixture was cooled to room temperature, 3.5 l. of diethylether and 1.5 l. of 5% aqueous sodium bicarbonate solution were added. The organic layer was separated and washed with water until neutral reaction. After drying on sodium sulfate the solvent was evaporated and the residue crystallized from 650 ml. of acetone. The yield was 74 g. of androst-5-en-17β-ol-3-on 3-ethylene ketal-17-acetate, M.P. 201–202°. From the mother liquor a second crop could be isolated.

40 g. of the aforementioned ketal were dissolved in 3.5 l. of petroleum ether (60–80°) and after the addition of 16.8 g. of N,N'-dibromo-dimethylhydantoine and 40 ml. of s-collidine the mixture was stirred and boiled for 20 minutes. The reaction mixture was cooled to room temperature and filtrated. The solid was washed with 1.5 l. of warm CCl$_4$ and the combined filtrates were distilled in vacuo.

To the residue 400 ml. of s-collidine were added and solution heated at 120° in a nitrogen atmosphere for 20 minutes. The reaction mixture was worked up as described in Example 1 and the product crystallized from 400 ml. of acetone. The yield was 25 g. M.P. 183–186°. Recrystallization from acetone gave a product with M.P. 186–189°, containing 55% of androsta-5,7-diene-17β - ol-3-on-3-ethylene-ketal-17-acetate, calculated from the U.V. absorption spectrum.

50 g. of a mixture of 45% androst-5-en-17β-ol-3-one 17-acetate 3-ethylene ketal and 55% of androsta-5,7-dien-17β-ol-3-one 3-ethylene ketal 17-acetate were dissolved in 2 litres of ethyl acetate and irradiated for 112 minutes in the same way as described in Example 1. The solution was concentrated to 175 ml. and crystallized at —15°. After filtration 29 g. of starting material were obtained and from the mother liquor another 6.5 g.

The solvent was evaporated and the residue dissolved in 20 ml. of methanol. Crystallization at —25° gave 4.5 g. of impure 9β,10α-compound net content 55%. Several recrystallizations from various solvents yielded 2.96 g. of 9β,10α - androsta - 5,7 - dien-17β-ol-3-one 3-ethylene ketal 17-acetate, net content 82%.

1 g. of the latter compound was dissolved in 15 ml. of methylene-dichloride, the solution cooled to 0° and added while stirring to 15 ml. of a solution of 53 g. of hydrogen chloride in 100 g. of dry ethanol (cooled to 0°). The mixture was kept for 30 minutes at 0°. Thereafter the reaction mixture was poured into 50 g. of water and 50 g. of ice. The organic layer was separated off and worked up in the same way as described in Example 1. The crude product was chromatographed on silica and crystallized from a mixture of n-hexane and acetone. The compound was identified as 9β,10α-androsta-4,6-dien-17β-ol-3-one 17-acetate by melting point (133–135°) U.V. and I.R. absorption spectra and mixed melting point with an authentic sample.

(7) According to the method of Oppenauer 16α-methyl progesterone was prepared from 16α-methyl pregnenolone in toluene and cyclohexanone, with aluminium isopropylate as a catalyst, in a yield of 84%, M.P. 135–136°.

60 g. of 16α-methyl progesterone were suspended in 600 ml. of ethylene glycol and 240 mg. of p-toluene sulfonic acid were added. The mixture was subjected to distillation in vacuo while stirring. In 4 hours 350 ml. of glycol distilled off. To the residue 15 ml. of 3 N potassium hydroxide in methanol and 400 ml. of methylene dichloride were added. The layer of ethylene glycol was separated off and extracted once with 100 ml. of methylene dichloride. The layers of methylene dichloride were collected, washed with water to neutral reaction, the solvent evaporated and the residue crystallized from 750 ml. of ethyl acetate. Yield 52.6 g. (69.1%) of 16α-methyl - pregn - 5 - ene-3,20-dione 3,20-bisethylene ketal, M.P. 198–201°. From the mother liquor a second crop could be crystallized. The product was recrystallized from ethyl acetate (yield 85%) M.P. 201–203°.

The latter mentioned diketal was converted into 16α-methyl-pregna-5,7-diene-3,20-dione-3 - ethylene - ketal by bromination and subsequent dehydrobromination in the same way as described in Example 5. The product was crystallized from ethanol, M.P. 176–178°.

Maxima in the I.R. spectrum were found at 810, 1100, 1650, 1700 and 3040 cm.$^{-1}$ This spectrum showed that the 20-ketal group had been hydrolysed, which might occur during the washings of the reaction mixture with 2 N sulphuric acid. The U.V. absorption spectrum indicated a content of 5,7-bisdehydro-compound of 85%.

17.4 g. of this monoketal were dissolved in 2 litres of methylacetate and irradiated for 60 minutes in the same way as described in Example 1. The solution was concentrated to 150 ml. and cooled to −15° after adding 100 ml. of methanol. 8.5 g. of unchanged starting material crystallized and from the mother liquor two crops of crude 16α-methyl-9β,10α-pregna-5,7-diene-3,20-dione 3-ethylene ketal were obtained. Recrystallization from various solvents yielded the pure compound, M.P. 163–175°, ε (λ max=271 mµ)=10,400, I.R. maxima at 815, 1100, 1660, 1700, 3050 cm.$^{-1}$ 130 mg. of this latter compound were dissolved in 10 ml. of methylene dichloride. After cooling to −5° 10 ml. of a cold solution (−5°) of 5.4 g. of hydrochloric acid in 10 ml. of dry ethanol were added. The reaction mixture was kept at −5° for 30 minutes and poured into cold water. The mixture was extracted with diethylether, the combined extracts washed with water, the solvent evaporated and the residue crystallized from ether. Recrystallization from ether and methanol gave pure 16α-methyl-9β,10α-pregna-4,6 - diene - 3,20 - dione, M.P. 147–148°; ε (λ max=285 mµ)=26,200. The substance proved to be identical with an authentic sample.

Some of the 4,6-bisdehydro-9β,10α-steroids described in this application have amongst others the following pharmacological activities:

9β,10α-pregna-4,6-diene-3,20-dione has progestational activity;

9β,10α-androsta - 4,6 - diene - 3,17 - dione has progestational, uterotropic and no androgenic activity;

17α-ethyl-9β,10α-androsta-4,6-dien-3-on-17β-ol 17-acetate shows pituitary inhibiting activity;

16α-methyl-9β,10α-pregna-4,6-dien-3,20-dione has anti-inflammatory and uterotropic activity.

What is claimed is:

1. In the method of producing a 3-keto-4,6-bisdehydro-9β,10α methyl steroid selected from the group consisting of the 9β,10α methyl steroids of the pregnane, androstane and ergostane series wherein a 3-hydroxy Δ$^{4,6}$-bisdehydro-9α,10β steroid selected from the group consisting of the 9α,10β steroids of the pregnane, androstane and ergostane series is subjected to a combination of steps including the Oppenauer oxidation of a 3-hydroxy group, ultraviolet radiation of a 5,7-bisdehydro steroid to form a 5,7-bisdehydro-9β,10α methyl steroid and the subsequent conversion of said 5,7-bisdehydro-9β,10α methyl steroid to the corresponding 3 keto-4,6-bisdehydro-9β,10α methyl steroid, the improvement which comprises carrying out the Oppenauer oxidation step prior to the ultraviolet irradiation step.

2. A method of producing a 3 keto-4,6-bisdehydro-9β,10α methyl steroid comprising the steps, subjecting a 3-hydroxy-5-dehydro-9α,10β steroid selected from the group consisting of the 9α,10β pregnane, androstane and ergostane series to an Oppenauer oxidation by means of a ketone in the presence of an aluminum alcoholate catalyst, ketalizing the resultant corresponding 3-keto-4-dehydro-9α,10β steroid by treatment with a reagent selected from the group consisting of the glycols and the dioxolanes under mildly acidic conditions to form the corresponding 3-ketal-5-dehydro-9α,10β steroid, treating said 3-ketal-5-dehydro-9α,10β steroid with an agent selected from the group consisting of N-bromosuccinimide and N,N$^1$-debromodimethyl- hydantoine to form the corresponding 3-ketal-5 dehydro 7-bromo 9α,10β steroid and treating said 3-ketal-5-dehydro-7-bromo-9α,10β steroid with a dehydrobrominating agent to thereby form the corresponding 3 - ketal - 5,7 - bisdehydro-9α,10β steroid then subjecting said 3-ketal-5,7-bisdehydro-9α,10β steroid to the action of ultraviolet light to form the corresponding 3-ketal-5,7-bisdehydro-9β,10α methyl steroid, and then by the steps of hydrolysis and isomerization forming the corresponding 3-keto-4,6-bisdehydro-9β,10α methyl steroid.

3. The method of claim 2 wherein 3β-hydroxy-pregn-5-en-20-one is subjected to an Oppenauer oxidation to form pregn-4-ene-3,20 dione, said pregn-4-ene-3,20 dione is ketalized by treatment with a reagent selected from the group consisting of the gylcols and the dioxolanes under mildly acidic conditions to form pregn-5-en-3,20-dione 3,20-bis-ketal, treating said pregn-5-en-3,20-dione 3,20-bis-ketal with an agent selected from the group consisting of N-bromosuccinimide and N,N$^1$-dibromodimethyl-hydantoine and then splitting off hydrogen bromide from the resultant 7-bromopregn-5-en-3,20-dione 3,20-bis-ketal to form pregna - 5,7 - diene-3,20-dione-3,20-bis-ketal irradiating said pregna-5,7-diene 3,20-dione bis-ketal with ultraviolet light to thereby produce 9β,10α methyl pregna-5,7-diene-3,20 dione 3,20-bis ketal and then hydrolyzing and isomerizing said 9β,10α methyl pregna-5,7 dione 3,2-bis-ketal to form 9β,10α methyl-pregna-4,6-diene 3,20 dione.

4. The method of claim 2 wherein 3β-hydroxy-androst-5-en-17-one is subjected to an Oppenauer oxidation to form androst-4-ene-3,17 dione, said androst-4-ene-3,17 dione is ketalized by treatment with a reagent selected from the group consisting of the gylcols and the dioxolanes under mildly acidic conditions to form androst-5-en - 3,17 - dione 3,17 - bis - ketal, treating said androst-5 - en - 3,17 - dione 3,17 - bis - ketal with an agent selected from the group consisting of N-bromosuccinimide and N,N$^1$-dibromodimethylhydantoine and then splitting off hydrogen bromide from the resultant 7-bromoandrost-5-en-3,17 dione 3,17 ketal to form androsta-5,7-diene-3,17-dione - 3,17 - bis - ketal irradiating said androsta-5,7-diene 3,17-dione bis-ketal with ultraviolet light to thereby produce 9β,10α methyl androsta-5,7-diene-3,17 dione 3,17-bis ketal and then hydrolyzing and isomerizing said 9β,10α methyl androsta-5,7-dione 3,17-bis-ketal to form 9β,10α methyl-androsta-4,6-diene 3,17 dione.

5. The method of claim 2 wherein the Oppenauer oxidation is carried out in a solvent, with cyclohexanone in the presence of aluminum isopropylate.

6. The method of claim 2 wherein the reagent for ketalization is selected from the group consisting of ethylene glycol, 2 - methyl-2-ethyl-1,3-dioxolane and 2-methyl-4,4-ethylenedioxypentene-2.

7. The method of claim 2 wherein the starting product is a 3-hydroxy 5,7-bisdehydro 9α,10β steroid.

8. A method of producing a 3-keto-4,6-bisdehydro 9β,10α-steroid selected from the group consisting of 9β,10α methyl pregnanes, androstanes and ergostanes, wherein the corresponding 3-ketal-5,7-bisdehydro-9β,10α-steroid is treated with a substantially waterfree aliphatic alcohol having 1–6 carbon atoms and containing at least 30% by weight of hydrogen halide calculated on the amount of alcohol, in which mixture other substantially waterfree solvents may be present.

9. The method of claim 8, wherein the hydrogen halide is hydrogen chloride.

10. The method of claim 9 wherein the reaction medium contains less than 1% of water.

11. The method of claim 10, wherein as another solvent a halogenated hydrocarbon containing 1–3 carbon atoms is present.

12. The method of claim 11, wherein the ratio of aliphatic alcohol to halogenated aliphatic hydrocarbon is between 1:0 and 1:30.

13. The method of claim 10, characterized in that the lower aliphatic alcohol is ethanol.

14. The method of claim 12 wherein the other solvent is methylene dichloride.

15. The method of claim 10 wherein the reaction is carried out at a temperature between −10° C. and 60° C. during a period of 15 minutes to 4 hours.

16. The method of claim 2 wherein 9β,10α-pregna-5,7-diene-3,20-dione 3,20-diketal is converted into 9β,10α-pregna-4,6-diene-3,20-dione.

17. The method of claim 10 wherein 9β,10α-ergosta-5,7,22-trien-3-one 3-ketal is coverted into 9β,10α-ergosta-4,6,22-triene-3-one.

18. The method of claim 10 wherein 9β,10α-androsta-5,7-diene-3,17-dione 3,17-diketal is converted into 9β,10α-androsta-4,6-diene-3,17-dione.

19. 9β,10α-pregna-5,7-diene-3,20-dione 3,20-bis-ketal.

20. 9β,10α-ergosta-5,7,22-triene-3-one 3-ketal.

21. 9β,10α-androsta-5,7-diene-3,17-dione 3,17-bis-ketal.

22. 9β,10α - pregna-5,7-diene-3,20-dione 3,20-bis-ethylene ketal.

23. 9β,10α-ergosta-5,7,22-triene-3-one 3-ethylene ketal.

24. 9β,10α-androsta-5,7-diene-3,17-dione 3,17-bis-ethylene ketal.

25. 17α - ethyl-9β,10α-androsta-5,7-dien-17β-ol-3-on 3-ethylene ketal 17-acetate.

26. 9β,10α - androsta - 5,7-dien-17β-ol-3-on-3-ethylene ketal 17-acetate.

27. 16α - methyl - 9β,10α-pegna-5.7-dien-3,20-dion 3-ethylene ketal.

28. 16α - methyl-pregna-5,7-dien-3,20-dion 3-ethylene ketal.

References Cited

UNITED STATES PATENTS 3,219,565  11/1965  Rappoldt _____ 204—162

OTHER REFERENCES

Rappoldt et al., "Rec. Trav. Chim.," vol. 80 (1961), pp. 43–46.

ELBERT L. ROBERTS, *Primary Examiner.*

LEWIS GOTTS, *Examiner.*

UNITED STATES PATENT OFFICE
CERTIFICATE OF CORRECTION

Patent No. 3,364,205            January 16, 1968

Theodorus Reinder Rix

It is certified that error appears in the above identified patent and that said Letters Patent are hereby corrected as shown below:

Column 4, lines 51 and 52, "irradiation" should read -- radiation --. Column 6, line 74, "ml. of sodium" should read -- ml. of a solution --.

Signed and sealed this 5th day of August 1969.

(SEAL)
Attest:

Edward M. Fletcher, Jr.            WILLIAM E. SCHUYLER, JR.
Attesting Officer                         Commissioner of Patents